(12) United States Patent
Pezeshki et al.

(10) Patent No.: US 12,089,242 B2
(45) Date of Patent: Sep. 10, 2024

(54) QUALITY METRIC SIGNALING FOR BEAM STRENGTH PREDICTION

(71) Applicant: QUALCOMM Incorporated, San Diego, CA (US)

(72) Inventors: Hamed Pezeshki, San Diego, CA (US); Tao Luo, San Diego, CA (US); Arumugam Chendamarai Kannan, San Diego, CA (US); Philip Aaron Sisk, San Diego, CA (US); Taesang Yoo, San Diego, CA (US); Mahmoud Taherzadeh Boroujeni, San Diego, CA (US)

(*) Notice: Subject to any disclaimer, the term of this patent is extended or adjusted under 35 U.S.C. 154(b) by 367 days.

(21) Appl. No.: 17/404,777

(22) Filed: Aug. 17, 2021

(65) Prior Publication Data

US 2023/0053589 A1    Feb. 23, 2023

(51) Int. Cl.
*H04W 72/54*    (2023.01)
*G06N 20/00*    (2019.01)
*H04W 24/10*    (2009.01)
*H04W 72/044*   (2023.01)
*H04W 72/542*   (2023.01)

(52) U.S. Cl.
CPC .......... *H04W 72/542* (2023.01); *G06N 20/00* (2019.01); *H04W 24/10* (2013.01); *H04W 72/044* (2013.01)

(58) Field of Classification Search
CPC . H04W 72/542; H04W 24/10; H04W 72/044; G06N 20/00; G06N 3/04; H04B 7/0632; H04B 7/0695
See application file for complete search history.

(56) References Cited

U.S. PATENT DOCUMENTS

| | | | |
|---|---|---|---|
| 2018/0159600 A1* | 6/2018 | Kim | H04B 7/088 |
| 2019/0044631 A1* | 2/2019 | Davydov | H04B 17/382 |
| 2020/0145080 A1* | 5/2020 | Tang | H04B 7/088 |
| 2020/0212991 A1* | 7/2020 | Cho | H04B 17/373 |

* cited by examiner

*Primary Examiner* — Steven Hieu D Nguyen

(57) ABSTRACT

Certain aspects of the present disclosure provide techniques for predicting a strength of a transmission beam in a communication system. In one example, the disclosure describes a user equipment (UE) receiving a quality metric from a base station (BS), the quality metric indicating one or more tolerance levels for predicted beam strength as compared to actual beam strength at the UE. In some examples, the UE may transmit, to the BS, one or more indications of actual beam strength as measured at the UE at one or more time periods for one or more transmit beams of the BS.

15 Claims, 9 Drawing Sheets

700

TRANSMIT, TO A USER EQUIPMENT (UE), A QUALITY METRIC INDICATIVE OF ONE OR MORE TOLERANCE LEVELS FOR PREDICTED BEAM STRENGTH AS COMPARED TO ACTUAL BEAM STRENGTH AT THE UE — 710

RECEIVE, FROM THE UE, ONE OR MORE INDICATIONS OF ACTUAL BEAM STRENGTH AS MEASURED AT THE UE AT ONE OR MORE TIME PERIODS FOR ONE OR MORE TRANSMIT BEAMS OF THE BS — 720

A METHOD FOR DETERMINING RELIABILITY OF A BEAM PREDICTION MECHANISM

FIG. 7

QUALITY METRIC SIGNALING FOR BEAM STRENGTH PREDICTION

INTRODUCTION

Aspects of the present disclosure relate to wireless communications, and more particularly, to techniques related to beamforming.

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communications systems to overcome various challenges.

SUMMARY

One aspect provides a user equipment (UE) comprising a memory and a processor coupled to the memory. In some examples, the processor and the memory are configured to receive a quality metric from a base station (BS), the quality metric indicating one or more tolerance levels for predicted beam strength as compared to actual beam strength at the UE. In some examples, the processor and the memory are configured to transmit, to the BS, one or more indications of actual beam strength as measured at the UE at one or more time periods for one or more transmit beams of the BS.

One aspect relates to a method of communication by a user equipment (UE). In some examples, the method includes receiving a quality metric from a base station (BS), the quality metric indicating one or more tolerance levels for predicted beam strength as compared to actual beam strength at the UE. In some examples, the method includes transmitting, to the BS, one or more indications of actual beam strength as measured at the UE at one or more time periods for one or more transmit beams of the BS.

One aspect relates to a user equipment (UE). In some examples, the UE includes means for receiving a quality metric from a base station (BS), the quality metric indicating one or more tolerance levels for predicted beam strength as compared to actual beam strength at the UE. In some examples, the UE includes means for transmitting, to the BS, one or more indications of actual beam strength as measured at the UE at one or more time periods for one or more transmit beams of the BS.

One aspect relates to a non-transitory computer-readable medium having instructions stored thereon that, when executed by a user equipment (UE), cause the UE to perform operations. In some examples, the operations include receiving a quality metric from a base station (BS), the quality metric indicating one or more tolerance levels for predicted beam strength as compared to actual beam strength at the UE. In some examples, the operations include transmitting, to the BS, one or more indications of actual beam strength as measured at the UE at one or more time periods for one or more transmit beams of the BS.

One aspect relates to a base station (BS) comprising a memory and a processor coupled to the memory. In some examples, the processor and the memory are configured to transmit, to a user equipment (UE), a quality metric indicative of one or more tolerance levels for predicted beam strength as compared to actual beam strength at the UE. In some examples, the processor and the memory are configured to receive, from the UE, one or more indications of actual beam strength as measured at the UE at one or more time periods for one or more transmit beams of the BS.

One aspect relates to a method for wireless communication by a base station (BS). In some examples, the method includes transmitting, to a user equipment (UE), a quality metric indicative of one or more tolerance levels for predicted beam strength as compared to actual beam strength at the UE. In some examples, the method includes receiving, from the UE, one or more indications of actual beam strength as measured at the UE at one or more time periods for one or more transmit beams of the BS.

One aspect relates to a base station (BS). In some examples, the BS includes means for transmitting, to a user equipment (UE), a quality metric indicative of one or more tolerance levels for predicted beam strength as compared to actual beam strength at the UE. In some examples, the BS includes means for receiving, from the UE, one or more indications of actual beam strength as measured at the UE at one or more time periods for one or more transmit beams of the BS.

One aspect relates to a non-transitory computer-readable medium having instructions stored thereon that, when executed by a base station (BS), cause the BS to perform operations. In some examples, the operations include transmitting, to a user equipment (UE), a quality metric indicative of one or more tolerance levels for predicted beam strength as compared to actual beam strength at the UE. In some examples, the operations include receiving, from the UE, one or more indications of actual beam strength as measured at the UE at one or more time periods for one or more transmit beams of the BS.

Other aspects provide: an apparatus operable, configured, or otherwise adapted to perform the aforementioned methods as well as those described elsewhere herein; a non-transitory, computer-readable media comprising instructions that, when executed by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

FIG. 7 is a flow diagram illustrating example operations for wireless communication.

DETAILED DESCRIPTION

Figure 1:
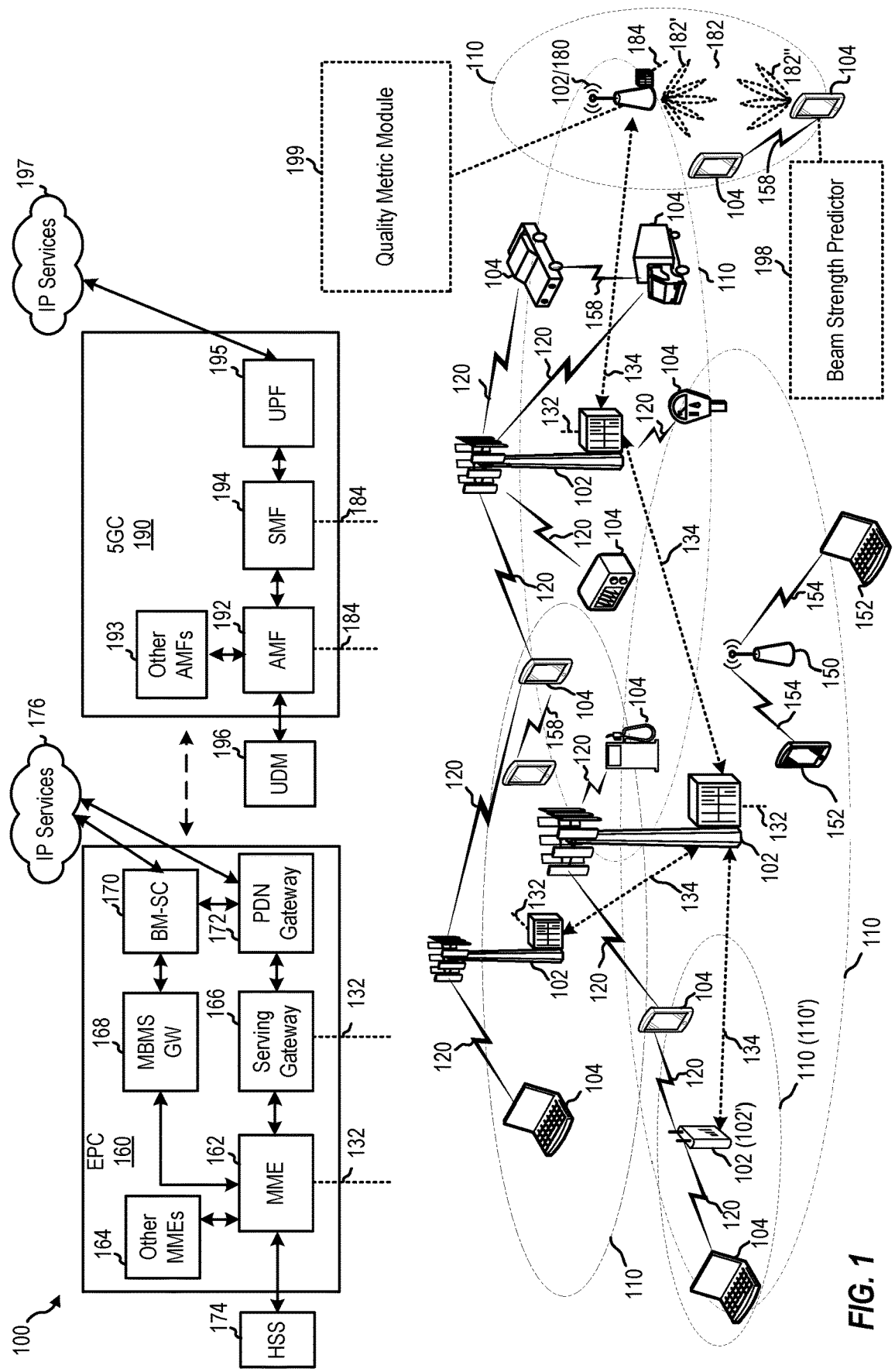
FIG. 1 is a block diagram conceptually illustrating an example wireless communication network.

Aspects of the present disclosure provide apparatuses, methods, processing systems, and computer-readable mediums for signaling a quality metric for predicting a beam strength of a transmitting beam.

In wireless communication between two nodes (e.g., a user equipment (UE) and a base station (BS)), each node may be capable of using beamforming for transmission and/or reception of wireless signals. In particular, each node may be capable of, at any given time, using one or more of multiple directional transmit beams for transmission of signals and/or using one or more of multiple directional receive beams for reception of signals to support a robust communication link between the two nodes. For example, a BS may transmit downlink signaling to one or more UEs over multiple transmit beams, wherein each of the multiple transmit beams is pointed in a direction that is different relative to other of the multiple transmit beams. The use of multiple transmit beams enables a wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase a data rate or to multiple UEs to increase an overall system capacity. However, such as due to mobility of a UE, the quality associated with one or more of the multiple transmit beams as received at the UE may change. For example, the UE may travel away from a direction of a transmit beam, or into an area with a physical obstruction with respect to the transmit beam. In some examples, one or more of the transmit beams used by the BS may experience a relatively high level of interference, or may be reflected or absorbed by a physical surface in-between the UE and the BS.

Aspects of the present disclosure provide techniques for a UE to actively predict a future strength as measured at the UE of one or more transmit beams of a BS. In certain aspects, the "strength" as measured at the UE for a particular transmit beam may refer to a reference signal received power (RSRP) as measured at the UE for a reference signal (RS) transmitted by the BS over the particular transmit beam. In an example, a prediction mechanism of the UE may be trained to predict the future strength of one or more of the BS transmit beams based at least in part on previous measurements of the one or more BS transmit beams. In certain aspects, this provides the UE with an ability to better select a transmit and/or receive beam that the UE may use in an upcoming communication with the BS. For example, if the UE predicts that a particular transmit beam of the BS will have a better strength for an upcoming downlink communication, the UE may use a receive beam that correlates to better reception of the particular transmit beam. Further, in certain aspects, if the UE predicts that a particular transmit beam of the BS will have a better strength for an upcoming uplink communication by the UE, the UE may use a transmit beam that has a similar directionality as the particular transmit beam to transmit to the BS. In certain aspects, such an ability may allow the UE to perform transmit beam and/or receive beam sweeping, such as part of a beamforming or beam training procedure, using a relatively reduced subset of UE-side transmit and/or receive beams. For example, the UE may perform beam training to determine which transmit and/or receive beam to use for communication with a BS. The UE may measure communications, or sweep, over multiple transmit and/or receive beams and select a particular transmit and/or receive beam base on the measurements. In certain aspects, the UE may sweep over only a subset of transmit and/or receive beams that have a similar directionality as one or more BS transmit beams having a predicted future strength that satisfies a condition (e.g., is higher than a threshold). A similar directionality may refer to having an angle of arrival within a threshold of the BS transmit beam. However, for beam strength predictions to be effective, they generally need to be accurate.

Accordingly, certain aspects of the present disclosure provide techniques for determining whether the beam-strength predictions of the prediction mechanism are reliable predictions. In particular, certain aspects relate to a BS providing a quality metric to the UE that the UE uses to determine whether the predictions are within a tolerance range. In certain aspects, such a determination allows the UE to detect whether or not the prediction mechanism is providing reliable predictions. In certain aspects, the determination allows the UE to switch from the prediction mechanism to another more effective method of determining downlink beam strength if the predictions are no longer reliable. In certain aspects, the determination allows the UE to recalibrate its prediction mechanism upon detection of an unreliable or ineffective prediction in order to increase the reliability of the prediction mechanism.

Introduction to Wireless Communication Networks

FIG. 1 depicts an example of a wireless communications system 100, in which aspects described herein may be implemented.

Generally, wireless communications system 100 includes base stations (BSs) 102, multiple instances of user equipment (UEs) 104, one or more core networks, such as an evolved packet core (EPC) 160 and 5G core (5GC) network 190, which interoperate to provide wireless communications services.

Base stations 102 may provide an access point to the EPC 160 and/or 5GC 190 for a user equipment 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. Base stations may include and/or be referred to as a gNB, NodeB, eNB, ng-eNB (e.g., an eNB that has been enhanced to provide connection to both EPC 160 and 5GC 190), an access point, a base transceiver station, a radio base station, a radio transceiver, or a transceiver function, or a transmission reception point in various contexts.

Base stations 102 wirelessly communicate with UEs 104 via communications links 120. Each of base stations 102 may provide communication coverage for a respective geographic coverage area 110, which may overlap in some cases. For example, small cell 102' (e.g., a low-power base station) may have a coverage area 110' that overlaps the coverage area 110 of one or more macrocells (e.g., high-power base stations).

The communication links 120 between base stations 102 and UEs 104 may include uplink (UL) (also referred to as reverse link) transmissions from a user equipment 104 to a base station 102 and/or downlink (DL) (also referred to as forward link) transmissions from a base station 102 to a user equipment 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, base station 180 and the UE 104 may each include a plurality of antennas, such as antenna elements, antenna panels, and/or antenna arrays to facilitate the beamforming.

In some cases, base station 180 may transmit a beamformed signal to UE 104 in one or more transmit directions 182'. UE 104 may receive the beamformed signal from the base station 180 in one or more receive directions 182". UE 104 may also transmit a beamformed signal to the base station 180 in one or more transmit directions 182". Base station 180 may also receive the beamformed signal from UE 104 in one or more receive directions 182'. Base station 180 and UE 104 may then perform beam training to determine the best receive and transmit directions for each of base station 180 and UE 104. Notably, the transmit and receive directions for base station 180 may or may not be the same. Similarly, the transmit and receive directions for UE 104 may or may not be the same.

One or more UEs 104 of the wireless communication system 100 may include a beam strength predictor 198, which may be configured to predict a beam strength of one or more transmitting beams of one or more base stations 102/180. One or base stations 102/180 of the wireless communication system 100 may include a quality metric module 199, which may be configured to (e.g., determine and) tranmsit a quality metric to the UE 104.

Figure 2:
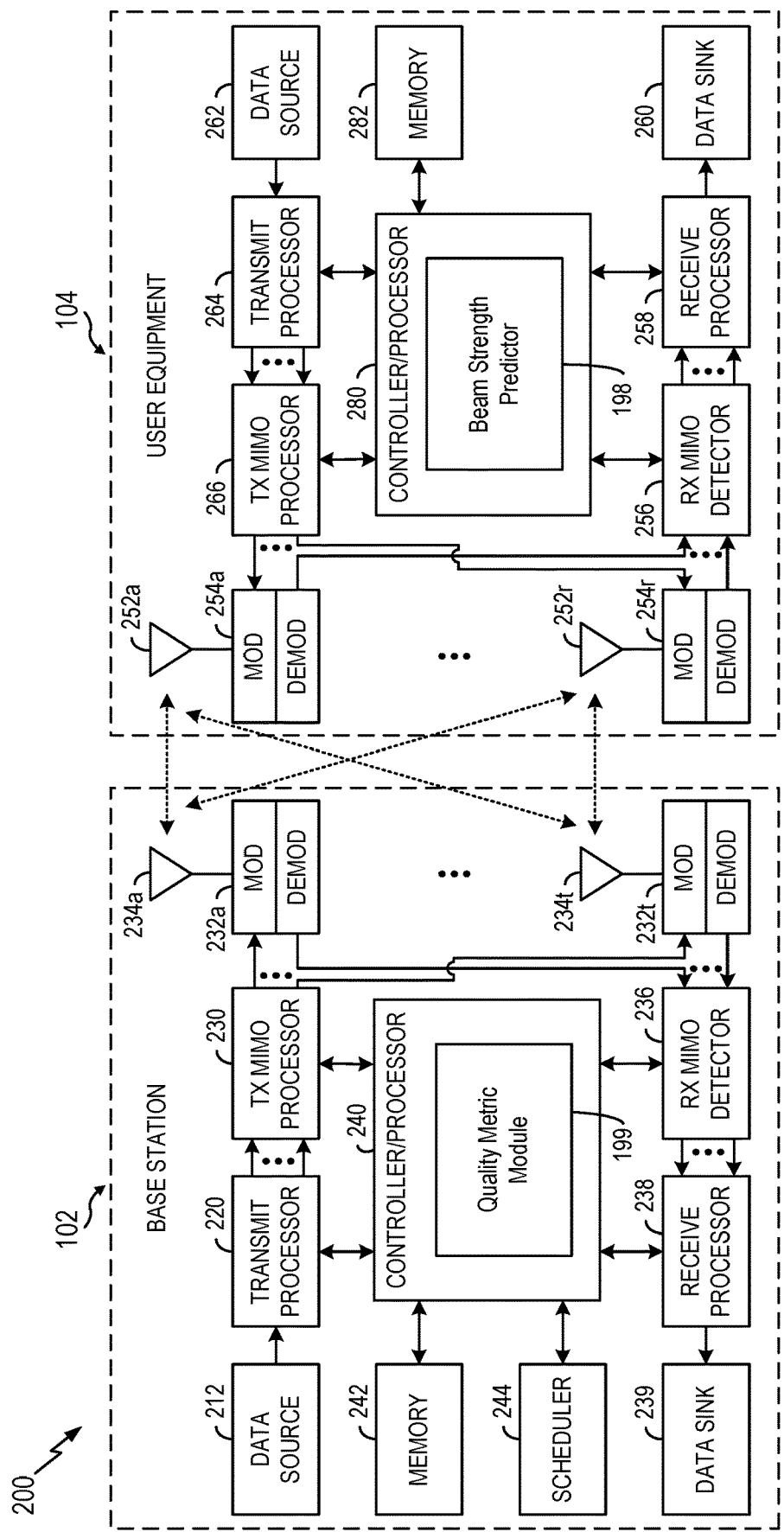
FIG. 2 is a block diagram conceptually illustrating aspects of an example of a base station and user equipment.

FIG. 2 depicts aspects of an example base station (BS) 102 and a user equipment (UE) 104.

Generally, base station 102 includes various processors (e.g., 220, 230, 238, and 240), antennas 234a-t (collectively 234), transceivers 232a-t (collectively 232), which include modulators and demodulators, and other aspects, which enable wireless transmission of data (e.g., data source 212) and wireless reception of data (e.g., data sink 239). For example, base station 102 may send and receive data between itself and user equipment 104.

Base station 102 includes controller/processor 240, which may be configured to implement various functions related to wireless communications. Notably, while depicted as an aspect of controller/processor 240, quality metric module 199 may be implemented additionally or alternatively in various other aspects of base station 102 in other implementations.

Generally, user equipment 104 includes various processors (e.g., 258, 264, 266, and 280), antennas 252a-r (collectively 252), transceivers 254a-r (collectively 254), which include modulators and demodulators, and other aspects, which enable wireless transmission of data (e.g., data source 262) and wireless reception of data (e.g., data sink 260).

User equipment 104 includes controller/processor 280, which may be configured to implement various functions related to wireless communications. In the depicted example, controller/processor 280 includes the beam strength predictor 198. Notably, while depicted as an aspect of controller/processor 280, the beam strength predictor 198 may be implemented additionally or alternatively in various other aspects of user equipment 104 in other implementations.

Figure 3:
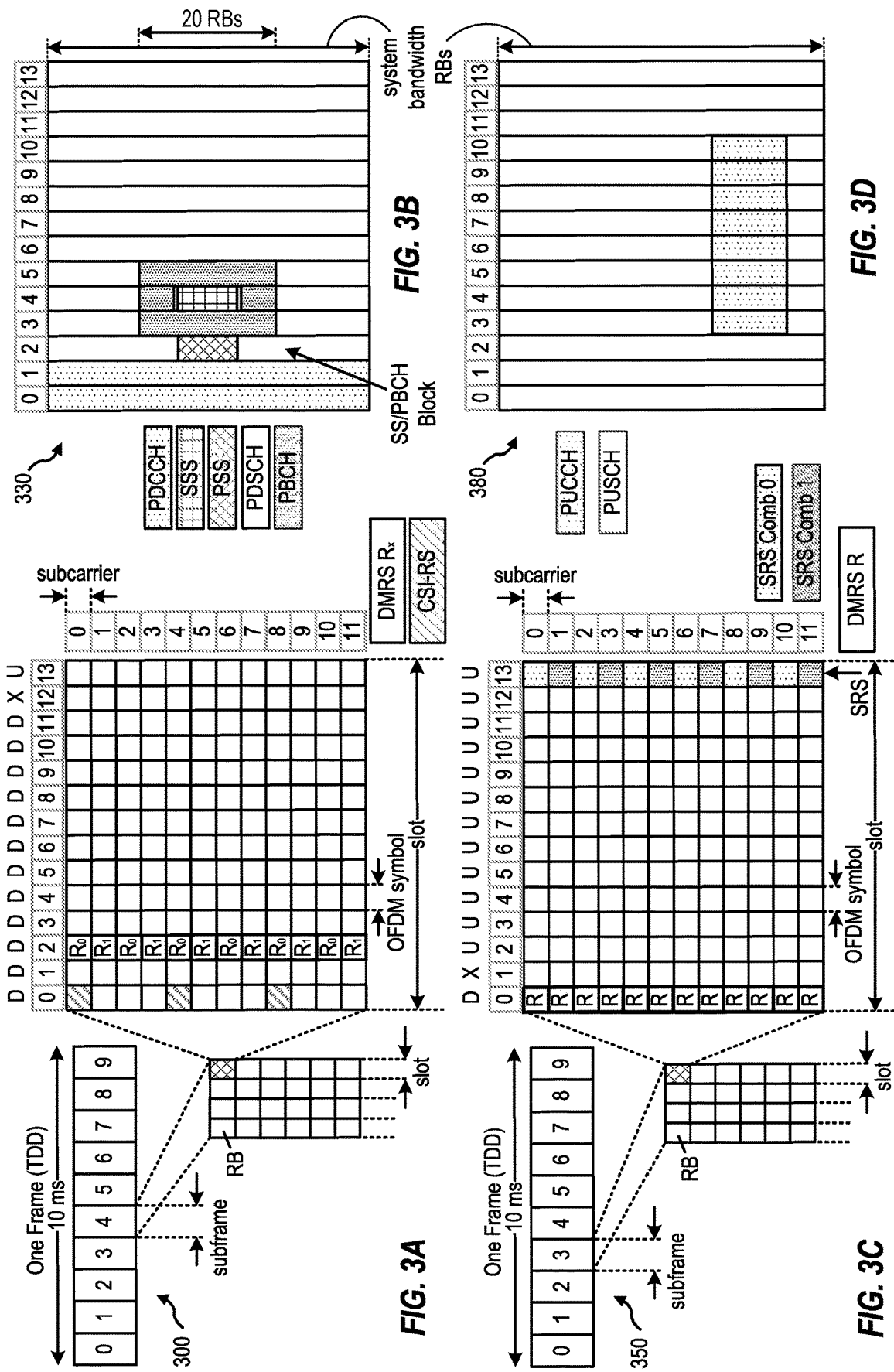
FIGS. 3A-3D are schematic diagrams illustrating various example aspects of data structures for a wireless communication network.

FIGS. 3A-3D depict aspects of data structures for a wireless communication network, such as wireless communication network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A-3D are provided later in this disclosure.

Introduction to Neural Networks

Neural networks generally represent an example of a machine learning model. Neural networks may be organized into layers of interconnected nodes. Generally, a node (or neuron) is where computation happens. For example, a node may combine input data with a set of weights (or coefficients) that either amplifies or dampens the input data. The amplification or dampening of the input signals may thus be considered an assignment of relative significances to various inputs with regard to a task the network is trying to learn. Generally, input-weight products are summed (or accumulated), and then the sum is passed through a node's activation function to determine whether and to what extent that signal should progress further through the network.

In a most basic implementation, a neural network may have an input layer, a hidden layer, and an output layer. "Deep" neural networks generally have more than one hidden layer.

Deep learning is a method of training deep neural networks. Generally, deep learning maps inputs to the network to outputs from the network and is thus sometimes referred to as a "universal approximator" because deep learning can learn to approximate an unknown function $f(x)=y$ between any input x and any output y. In other words, deep learning finds the right $f$ to transform x into y.

More particularly, deep learning trains each layer of nodes based on a distinct set of features, which is the output from the previous layer. Thus, with each successive layer of a deep neural network, features become more complex. As such, deep learning is powerful because it can progressively extract higher-level features from input data and perform complex tasks, such as object recognition, by learning to represent inputs at successively higher levels of abstraction in each layer, thereby building up a useful feature representation of the input data.

For example, if presented with visual data, a first layer of a deep neural network may learn to recognize relatively simple features, such as edges, in the input data. In another example, if presented with auditory data, the first layer of a deep neural network may learn to recognize spectral power in specific frequencies in the input data. The second layer of the deep neural network may then learn to recognize combinations of features, such as simple shapes for visual data or combinations of sounds for auditory data, based on the output of the first layer. Higher layers may then learn to recognize complex shapes in visual data or words in auditory data. Still higher layers may learn to recognize common visual objects or spoken phrases. Thus, deep learning architectures may perform especially well when applied to problems that have a natural hierarchical structure.

In certain aspects, a prediction mechanism of a UE (e.g., UE 104 of FIGS. 1 and 2) may include a machine learning model, such as a neural network, an autoregressive model, or the like, configured to predict a transmit beam strength for a transmit beam associated with a signal transmitted from a BS on the transmit beam (e.g., BS 102 of FIGS. 1 and 2). Though certain aspects are discussed with respect to use of a machine learning model, and in particular a neural network, any suitable prediction mechanism may be used. For example, the neural network may be presented with historical beam information relating to previous strengths of beams transmitted by the BS 102 and measured by the UE 104. In some examples, the historical information may include a table maintained by the UE 104, wherein the table includes values of previously measured beam strengths associated with one or more beams and corresponding to one or more previous time instances or periods (e.g., previous measurements of beam strengths represented in two dimensions: time and an identifier of a particular beam). As such, the historical beam information may be used to develop a function ($f$) the neural network can use to predict a future beam strength associated with one or more BS 102 transmit beams.

Aspects Related to Beam Prediction and Prediction Mechanism Reliability

Figure 4:
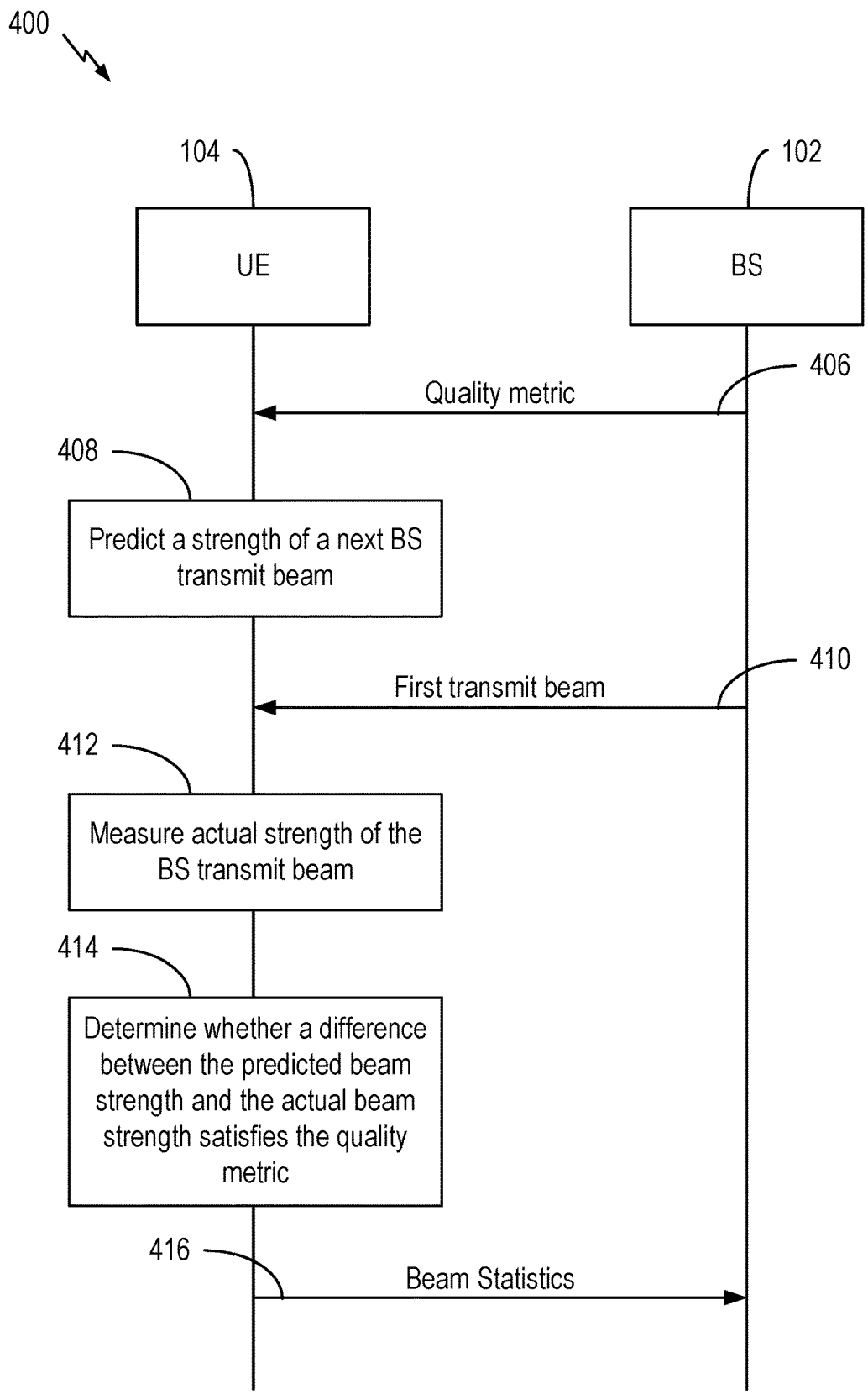
FIG. 4 is a call-flow diagram illustrating an example communication between a user equipment (UE) and a base station (BS).

FIG. 4 is a call-flow diagram illustrating example communications between a UE (e.g., UE 104 of FIGS. 1 and 2) and a BS (e.g., BS 102 of FIGS. 1 and 2). In this illustration, time advances in the downward direction, and communication signals between the illustrated entities are denoted with arrows between the lines below the respective entities.

Initially, the BS 102 may transmit, to the UE 104, a first communication 406 having a quality metric included therein. The UE 104 may receive the first communication 406 and decode the quality metric. In one example, the quality metric is indicative of a beam prediction tolerance. That is, the quality metric may represent a (e.g., absolute value of a) maximum difference between a predicted strength of a beam and an actual strength of the beam, as predicted and measured by the UE 104. The first communication 406 may be transmitted via a radio resource control (RRC) message or a medium access control (MAC) control element (CE).

The quality metric may indicate a maximum value in units of beam strength as measured using any suitable technique for measuring the strength (e.g., an amount of power) of a signal, such as an RS, over a particular beam. For example, the UE 104 may measure the strength of a received signal for a particular beam and determine a reference signal received power (RSRP), a signal-to-interference-plus-noise ratio (SINR), and/or a reference signal received quality (RSRQ). In certain aspects, the quality metric may be expressed as a maximum decibel per milliwatt (dBm) value. For instance, if the BS 102 configures the UE 104 with a 30 dBm quality metric, then the UE 104 may use the 30 dBm as a maximum difference between an actual strength of a beam and a predicted strength of the beam. In this example, 30 dBm is a threshold value indicating an acceptable and an unacceptable difference between predicted and actual beam strength. In some examples, the quality metric may provide a value that maps to a particular beam strength value.

In some examples, the first communication 406 may include a beam identifier configured to indicate a specific transmit beam for which the quality metric applies. For example, the quality metric of the first communication 406 may identify a first transmit beam (e.g., a beam serving the UE 104) of the BS 102. In some examples, multiple quality metrics that apply to different beams may be transmitted to the UE 104 via a single transmit beam. That is, the first communication 406 may include multiple quality metrics, each corresponding to a particular transmit beam. In such an example, one or more quality metrics in the first communication 406 may include an identifier of a transmit beam to which the quality metric corresponds. Alternatively, the BS 102 may transmit multiple quality metrics to the UE 104 via a transmit beam corresponding to each of the multiple quality metrics. That is, the UE 104 may receive multiple quality metrics via multiple different beams transmitted from the same BS 102. In some examples, the UE 104 may assume that a quality metric applies to the transmit beam over which the first communication 406 is received. As such, a beam identifier associated with the quality metric may not be included in the first communication 406.

In some cases, the first communication 406 may include one or more quality metrics, wherein each of the one or more quality metrics correspond to one or more of a plurality of BS 102 transmit beams. That is, the BS 102 may set a particular quality metric for each of a plurality of BS 102 transmit beams. In some examples, the particular quality metric for each transmit beam may be based on a characteristic (e.g., transmit power) of the corresponding transmit beam. For example, if signals transmitted via a first transmit beam of the BS 102 are transmitted at a relatively high power, then the BS 102 may set a quality metric for that beam at a relatively low value (e.g., a 20 dBm quality metric). This is because downlink signaling transmitted over a higher-powered beam is more likely to be received by the UE 104 despite outside interference. Conversely, if signals transmitted via a second transmit beam of the BS 102 are transmitted at a relatively low power, then a beam prediction tolerance for that beam may be relatively high (e.g., a 40 dBm quality metric). This gives the UE's 104 prediction mechanism more room for prediction error, because signaling transmitted over the lower-powered beam may be more susceptible to attenuation or path loss due to outside interference that a higher-powered beam.

In some examples, if the BS 102 changes the transmission power of a particular transmit beam, the BS 102 may change the quality metric associated with that beam in response to the change in transmission power. Accordingly, the BS 102 may update the quality metric for a beam and provide the UE 104 with signaling indicating the updated quality metric if the power of that transmit beam changes.

In some examples, if the BS 102 detects a change of a mobility status of the UE 104, the BS 102 may also change a quality metric associated with one or more transmit beams in response to the detected change of UE 104 mobility. As used herein, a "mobility status" of the UE 104 may correspond to the speed or velocity of the UE 104, or any other suitable mobility factor detectable by the BS 102. For example, a mobility status may relate to a metric or a degree of variation in radio channel response characteristics over a certain period of time, when moving or stationary UE 104 sends measurement signals to the BS 102. A UE 104 mobility status may include multiple levels. For example, a first level may correspond to stationary, a second level may correspond to relatively slow moving, and a third level may correspond to relatively fast moving. The BS 102 may detect the mobility status change of the UE 104 based on explicit signaling from the UE 104, or based on measuring and monitoring, performed by the BS 102, variations of a UE's 104 uplink radio channel characteristics over time. In some examples, the quality metrics for the UE 104 may provide for a lower threshold (e.g., more strict) if the UE 104 is stationary. If the UE 104 is mobile, then the BS 102 may increase the threshold (e.g., relax) for the quality metrics for the UE. The BS 102 may relax the quality metrics further if the UE 104 becomes more mobile (e.g., moves faster).

Thus, as the mobility status of the UE 104 changes, the BS 102 may update the quality metrics for one or more transmit beams. However, in some cases, the UE 104 may automatically update the quality metrics for one or more transmit beams based on its mobility status. That is, the UE 104 may determine its own mobility status and dynamically update the quality metrics for a beam based on a pre-configured mapping of mobility status to quality metric.

In some examples, a quality metric may be a function of actual or predicted RSRP strength. That is, if the predicted RSRP or the actual RSRP of a beam as measured by the UE 104 is within a range of values, then the UE may determine the corresponding quality metric for that beam based on the RSRP. The BS 102 may provide one or more ranges of quality metric values in the first communication 406. In certain aspects, which quality metric to use is based on the actual transmit beam strength. In certain aspects, which quality metric to use is based on the predicted transmit beam strength. In certain aspects, which quality metric to use is based on both the actual transmit beam strength and the predicted beam strength (e.g., the lesser of the two, the greater of the two, and average, etc.). For example, if the actual RSRP of a BS 102 transmit beam, as measured by the UE 104, is relatively high (e.g., ≥−80 dBm), then a corresponding quality metric may indicate a relatively low beam prediction tolerance (e.g., 20 dBm). If the actual RSRP is lower (e.g., −90 to −100 dBm), then a corresponding quality metric may indicate a relatively higher beam prediction tolerance (e.g., 30 dBm). That is, if the RSRP is strong, then the UE 104 may be expected to have a more accurate beam strength prediction than if the RSRP is weaker. Thus, while the quality metric may be a fixed value, in some examples, the quality metric may instead correspond to a range of values that the UE 104 can map to a predicted RSRP determined by the UE 104, or an actual RSRP as measured by the UE 104.

In some examples, the BS 102 may include one or more ranges of values corresponding to a particular quality metric in the first communication 406, wherein each of the ranges of values correspond to a ranking of BS 102 transmit beams. In certain aspects, which quality metric to use is based on the actual transmit beam strength. In certain aspects, which quality metric to use is based on the predicted transmit beam strength. In certain aspects, which quality metric to use is based on both the actual transmit beam strength and the predicted beam strength (e.g., the lesser of the two, the greater of the two, and average, etc.). In one example, the UE 104 may rank one or more transmission beams used by the BS 102 for communications with the UE 104 based on an actual RSRP for each beam as measured by the UE 104. A beam with the highest RSRP may be highest ranked, and therefore, may have a relatively stricter quality metric. In this example, because the beam has the highest RSRP, the UE 104 may be expected to have a more accurate beam strength prediction than if the RSRP is weaker. Accordingly, the UE 104 may rank each BS 102 beam based on its actual RSRP, and determine a corresponding tolerance of beam strength prediction associated with the ranking.

In another example, the BS 102 may rank one or more of its transmit beams according to an associated transmit power level, and provide the ranking to the UE 104 in the first communication 406. The UE 104 may then determine a quality metric associated with each of the one or more beams based on a preconfigured or BS 102 configured mapping of beam ranking to quality metric. As such, the first communication 406 may also include the mapping of beam ranking to quality metric if the UE 104 has not already been configured with the mapping. In some examples, a rank of a transmit beam may correspond to a transmit power of that beam.

In a first process 408, the UE 104 may determine a predicted strength of a first transmit beam prior to a time that a signal is scheduled to be transmitted over the first transmit beam. For example, the BS 102 may be scheduled to transmit a signal to the UE 104 using the first transmit beam at a first time (e.g., t+1). As such, the UE 104 may utilize a prediction mechanism to predict the strength of the first transmit beam over which the signal is transmitted at a second time (e.g., t) prior to the first time. In some examples, the prediction mechanism may predict the RSRP of the first transmit beam. As discussed, the UE's 104 prediction mechanism may utilize previous beam measurement information (e.g., previously stored beam strength measurements, such as RSRP, of the first transmit beam made by the UE 104) to predict the beam's strength.

In a second communication 410, the BS may transmit the scheduled signal to the UE 104 over the first transmit beam for which the UE 104 predicted a beam strength. In a second process 412, the UE 104 may measure the actual beam strength (e.g., an RSRP) of the first transmit beam used to transmit the second communication 410.

In a third process 414, the UE 104 may determine whether a difference (e.g., absolute value of the difference) between the predicted strength and the actual strength of the first transmit beam satisfies the quality metric (e.g., whether a difference between the predicted strength and the actual strength of the first transmit beam is within a tolerance level) for the first transmit beam. This process is discussed in additional detail below in the description of FIG. 5.

In a third communication 416, the UE 104 may transmit, to the BS 102, statistics of whether the quality metric is satisfied for the first transmit beam of the second communication 410. The statistics may include one or more of an actual beam strength as measured at the UE 104, a predicted beam strength as predicted at the UE 104, a difference between the predicted and actual beam strengths, a time period (e.g., a time or a slot index) during which the first transmit beam was received, etc. In some examples, the statistics may include statistics for a plurality of transmit beams received by the UE 104. For example, the BS 102 may configure the UE 104 to transmit statistics once for every five downlink transmission received by the UE 104. In some examples, the statistics may include statistics regarding the percentage of time that the quality metric is satisfied at the UE 104 for one or more transmit beams, such as over a time period. For example, UE 104 may indicate to the BS 102, every X measurement instances (e.g., where X is an integer such as 1, 2, 5, 20, etc.) a percentage of times the quality metric was satisfied over the X measurement instances. For example, if the quality metric was satisfied Y times over the X measurement instances, the UE 104 may report Y/X as the percentage to BS 102.

It should be noted that the statistics may be transmitted in response to every downlink beam received by the UE 104, only a certain number of beams (as determined by the UE 104 or BS 102), or only when a quality metric has been updated. Thus, the UE 104 may automatically transmit statistics to the BS 102 in response to a received downlink beam and/or an event (e.g., a counter reaching a threshold value, an updated quality metric, a predicted RSRP being outside a quality metric threshold, and/or the like), or the UE 104 may transmit statistics in response to a BS 102 request for statistics.

Figure 5:
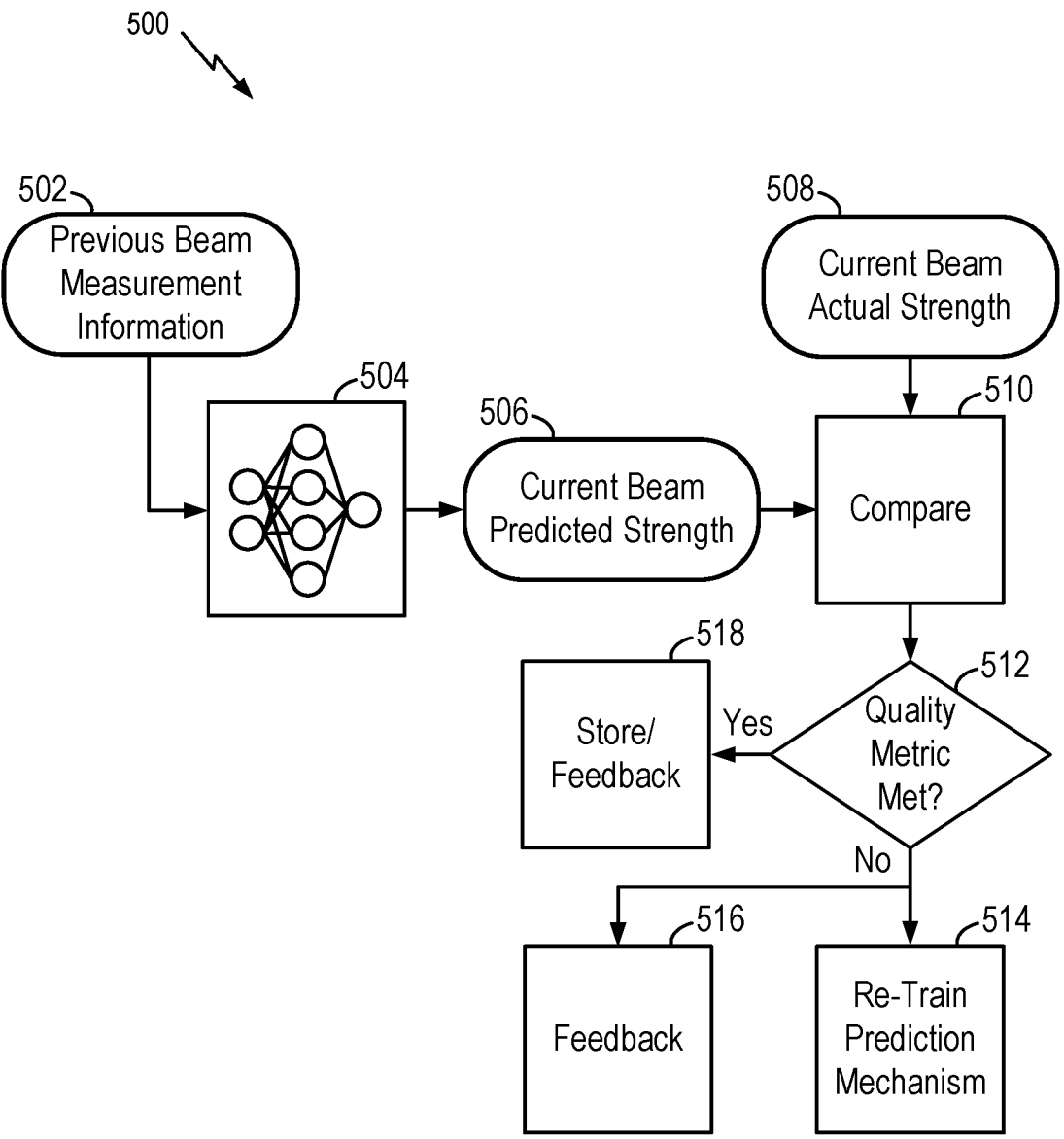
FIG. 5 is a flow chart illustrating an exemplary process for beam prediction using a quality metric.

FIG. 5 is a flow chart illustrating an exemplary process 500 for beam prediction using a quality metric. The process 500 is described from the point-of-view of a UE (e.g., UE 104 of FIGS. 1, 2, and 4), and may accordingly, as described in conjunction with FIGS. 6 and 7, be operational at the UE 104 by a general purpose processor, a processing system 802 as described below in FIG. 8, or any suitable means for carrying out the described functions. Aspects of the process 500 may be performed as part of the third process 414 as discussed above in FIG. 4, wherein the UE 104 may determine whether a difference between the predicted strength and the actual strength of the first transmit beam satisfies the quality metric for the first transmit beam.

At a first block 504, a prediction mechanism of the UE 104 may use previous beam measurement information 502 to predict a strength 506 of a transmit beam of a scheduled downlink transmission (e.g., a "current beam"). In some examples, the prediction mechanism includes a machine learning model, such as a neural network, trained to use previous beam measurement information to predict or approximate a beam strength of a future transmit beam used by the BS (e.g., BS 102 of FIGS. 1, 2, and 4) for downlink transmissions to the UE 104. In one example, the prediction mechanism may predict a strength of a serving beam used by the BS to transmit signaling to the UE 104, as well as a strength of one or more additional transmit beams used by the BS 102.

The previous beam measurement information 502 may include actual transmit beam strength measurements of previous signals received over one or more beams used by the BS 102, and/or training data used to train the machine learning model. In one example, the UE 104 may measure an actual beam strength of a serving beam used by the BS to communicate with the UE 104. The actual beam strength may reflect an RSRP of the serving beam as received by the UE 104. The UE 104 may then store that information in a digital storage or memory (e.g., memory 282 of FIG. 2) along with an indication of the time (e.g., slot index) at which the transmit beam was received. The UE 104 may measure the actual strength of multiple transmit beams used by the BS 102, and store the measurements along with the time, and in some cases, an indication of the beam associated with the measurement.

As discussed, the UE 104 may use the prediction mechanism of the first block 504 to predict a strength of a beam used to transmit a currently scheduled downlink transmission prior to the transmission. Upon receiving the scheduled downlink transmission, the UE 104 may then measure the actual strength 508 (e.g., RSRP) of the transmit beam carrying the scheduled downlink transmission. At a second block 510, the UE 104 may perform a compare function to compare the actual strength 508 to the predicted strength 506 of the same transmit beam. In some examples, the compare function is configured to determine a difference between a first RSRP value measured for the actual strength 508 and a second RSRP value predicted by the prediction mechanism for the predicted strength 506.

The UE 104 may then determine whether a quality metric is or is not satisfied 512 based on the difference between the first RSRP and the second RSRP. For example, if the quality metric indicates that the difference between the first RSRP and the second RSRP can be no greater than 30 dBm, and the difference between the first RSRP value and the second RSRP value is greater than 30 dBm, then the UE 104 may determine that the quality metric is not satisfied. In other words, if the predicted strength 506 of the transmit beam is off by more than 30 dBm, then the quality metric is not met. Conversely, if the difference between the first RSRP value and the second RSRP value is within 30 dBm, then the UE 104 may determine that the quality metric is satisfied. In this example, the quality metric represents a tolerance level of 30 dBm, wherein any difference within 30 dBm can be tolerated.

If the UE 104 determines that the quality metric is or is not satisfied, then the UE 104 may take an action based on the determination. For example, if the quality metric is not satisfied, then at a third block 514 the UE 104 may determine to retrain or update the prediction mechanism used in the first block 504. In one example, the UE 104 determining that the quality metric is not satisfied may be the result of a UE 104 mobility status change. In this example, retraining or updating the neural network may include retraining the prediction mechanism with additional samples of beam measurement information 502, additional classifiers (e.g., a classifier corresponding to the UE's mobility status), and/or any suitable information for improving the prediction mechanism's ability to predict a transmit beam RSRP. Retraining or updating the prediction mechanism may be performed over an Internet connection or over a cellular link (e.g., enhanced mobile broadband (eMBB)) between the UE 104 and BS.

In some examples, the UE 104 may maintain a number of instances that the quality metric is not satisfied. Here, if the UE 104 determines that the quality metric is not satisfied, the UE 104 may update a counter configured to count the number of instances that the quality metric is not satisfied for a beam strength prediction. In such an example, the UE 104 may refrain from retraining or updating the prediction mechanism until the counter reaches a threshold number. In other words, the UE 104 may refrain from retraining or updating the prediction mechanism until the quality metric is not satisfied a threshold number of times. Once the threshold number is met, the UE 104 may advance to the third block 514 and retrain or update the prediction mechanism, such as based at least in part on the difference between the first RSRP and the second RSRP not being within the first tolerance level for a threshold number of times or more than the threshold number of times.

At a fourth block 516, the UE 104 may also send feedback to the BS, wherein the feedback provides statistics of whether the quality metric is satisfied. In some examples, the UE 104 may feedback the difference between the first RSRP value and the second RSRP value if the difference is greater than the quality metric (e.g., the difference does not satisfy the quality metric). In this case, the UE 104 may only provide feedback when the quality metric is not satisfied. In another example, the UE 104 may provide an indication of a number of times the quality metric has been satisfied and/or unsatisfied within a duration of time (e.g., since establishing a communication link between the UE 104 and the BS, or for a fixed duration of time configured by the BS).

If the UE 104 determines that the quality metric is satisfied, then at a fifth block 518, the UE 104 may determine to store the difference between the predicted beam strength and the actual beam strength. The UE 104 may also transmit to the BS 102 an indication that the difference is within the tolerance level. In some examples, the UE 104 may transmit uplink transmissions comprising an indication that a difference determined for one or more beams is within the tolerance level. The UE 104 may also refrain from retraining or updating the prediction mechanism the difference between the predicted beam strength and the actual beam strength is within the tolerance level.

Figure 6:
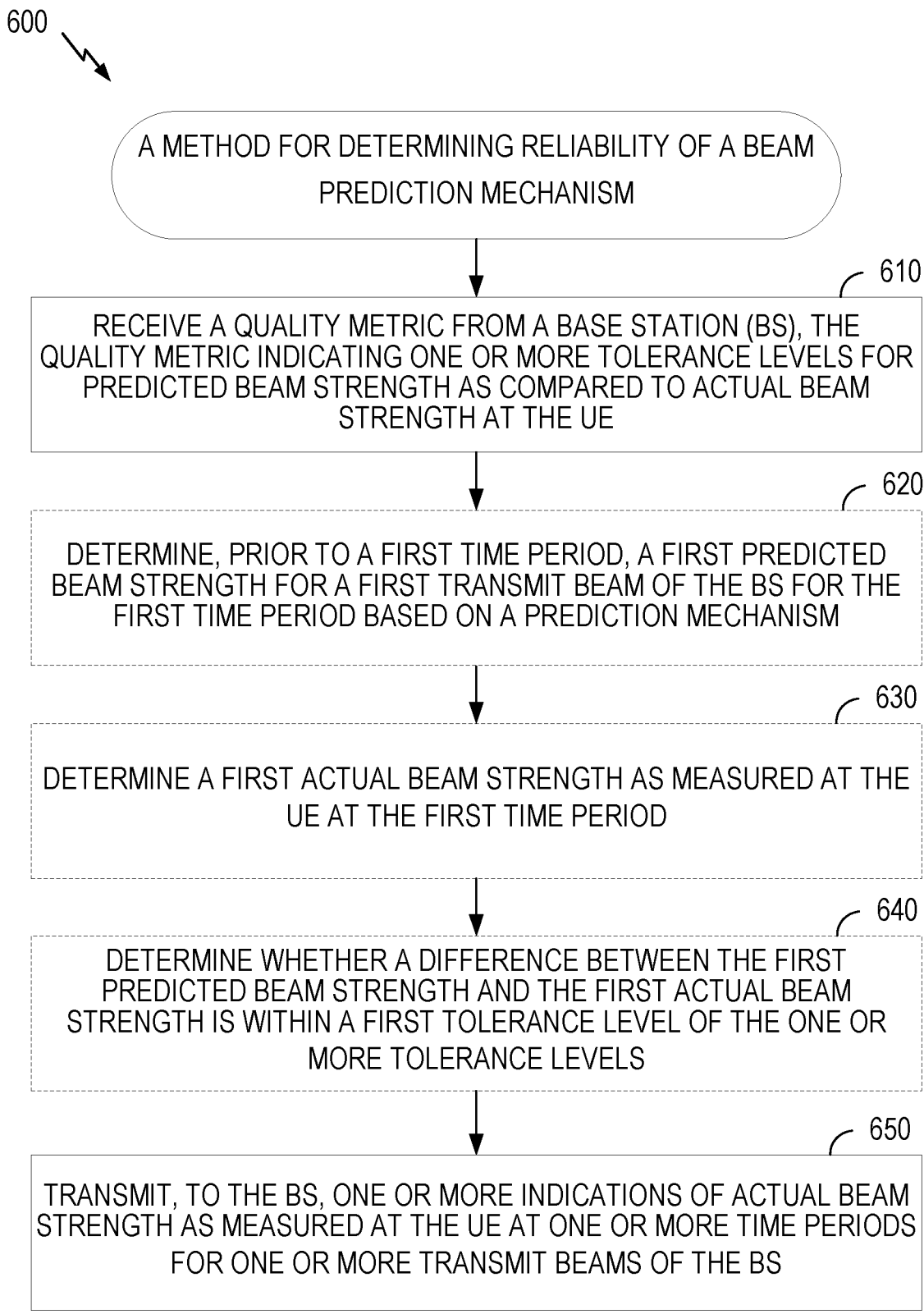
FIG. 6 is a flow diagram illustrating example operations for wireless communication.

FIG. 6 is a flow diagram illustrating example operations 600 for wireless communication, in accordance with certain aspects of the present disclosure. The operations 600 may be performed, for example, by a UE 104 (e.g., such as the UE 104 in FIGS. 1, 2, 4, and 5). The operations 600 may be implemented as software components that are executed and run on one or more processors (e.g., controller/processor 280 of FIG. 2) for determining reliability of a beam prediction mechanism. Further, the transmission and reception of signals by the UE 104 in operations 600 may be enabled, for example, by one or more antennas (e.g., antennas 252 of FIG. 2). In certain aspects, the transmission and/or reception of signals by the UE 104 may be implemented via a bus interface of one or more processors (e.g., controller/processor 280) obtaining and/or outputting signals.

The operations 600 may begin, at a first block 610, by receiving a quality metric from a BS, the quality metric indicating one or more tolerance levels for predicted beam strength as compared to actual beam strength at the UE.

Optionally, the operations 600 may proceed to a second block 620 by determining, prior to a first time period, a first predicted beam strength for a first transmit beam of the BS for the first time period based on a prediction mechanism.

Optionally, the operations 600 may proceed to a third block 630 by determining a first actual beam strength as measured at the UE at the first time period.

Optionally, the operations 600 may proceed to a fourth block 640 by determining whether a difference between the first predicted beam strength and the first actual beam strength is within a first tolerance level of the one or more tolerance levels.

The operations 600 may proceed to a fifth block 650 by transmitting, to the BS, one or more indications of actual beam strength as measured at the UE at one or more time periods for one or more transmit beams of the BS.

In certain aspects, the operations 600 may include taking an action based at least in part on whether the difference is within the first tolerance level.

In certain aspects, taking the action based at least in part on whether the difference is within the first tolerance level includes transmitting, to the BS, an indication of whether the difference is within the first tolerance level.

In certain aspects, taking the action based at least in part on whether the difference is within the first tolerance level includes updating the prediction mechanism based at least in part on the difference not being within the first tolerance level for more than a threshold number of times.

In certain aspects, the prediction mechanism comprises a machine learning model.

In certain aspects, the one or more tolerance levels comprise a plurality of tolerance levels, each tolerance level associated with a different value range for at least one of predicted beam strength or actual beam strength.

In certain aspects, the operations 600 include determining, prior to a first time period, a first predicted beam strength for a first transmit beam of the BS for the first time period based on a prediction mechanism; determining a first actual beam strength as measured at the UE at the first time period; determining whether a difference between the first predicted beam strength and the first actual beam strength is within a first tolerance level of the one or more tolerance levels, wherein the first tolerance level is associated with a first value range, and wherein at least one of the first predicted beam strength or the first actual beam strength is within the first value range; and taking an action based at least in part on whether the difference is within the first tolerance level.

In certain aspects, the one or more tolerance levels comprise a plurality of tolerance levels, each tolerance level associated with a different ranking for at least one of predicted beam strength or actual beam strength.

In certain aspects, the operations 600 include determining, prior to a first time period, a first predicted beam strength for a first transmit beam of the BS for the first time period based on a prediction mechanism; determining a first actual beam strength as measured at the UE at the first time period; determining whether a difference between the first predicted beam strength and the first actual beam strength is within a first tolerance level of the one or more tolerance levels, wherein the first tolerance level is associated with a first ranking, and wherein at least one of the first predicted beam strength or the first actual beam strength has a value ranked at the first ranking among values of predicted beam strength or actual beam strength corresponding to a plurality of transmit beams of the BS; and taking an action based at least in part on whether the difference is within the first tolerance level.

In certain aspects, a predicted beam strength comprises predicted reference signal received power (RSRP) and actual beam strength comprises actual RSRP.

In certain aspects, the operations 600 include receiving an updated quality metric from the BS.

In certain aspects, the updated quality metric is received in response to a mobility status change of the UE.

FIG. 7 is a flow diagram illustrating example operations 700 for wireless communication, in accordance with certain aspects of the present disclosure. The operations 700 may be performed, for example, by a BS (e.g., such as the BS 102 in FIGS. 1, 2, 4, and 5). The operations 700 may be complementary to the operations 600 performed by the UE. The operations 700 may be implemented as software components that are executed and run on one or more processors (e.g., controller/processor 240 of FIG. 2). Further, the transmission and reception of signals by the BS in operations 700 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 700 may begin, at a first block 710, by transmitting, to a UE, a quality metric indicative of one or more tolerance levels for predicted beam strength as compared to actual beam strength at the UE.

The operations 700 may proceed, at a second block 720, by receiving, from the UE, one or more indications of actual beam strength as measured at the UE at one or more time periods for one or more transmit beams of the BS.

Example Wireless Communication Devices

Figure 8:
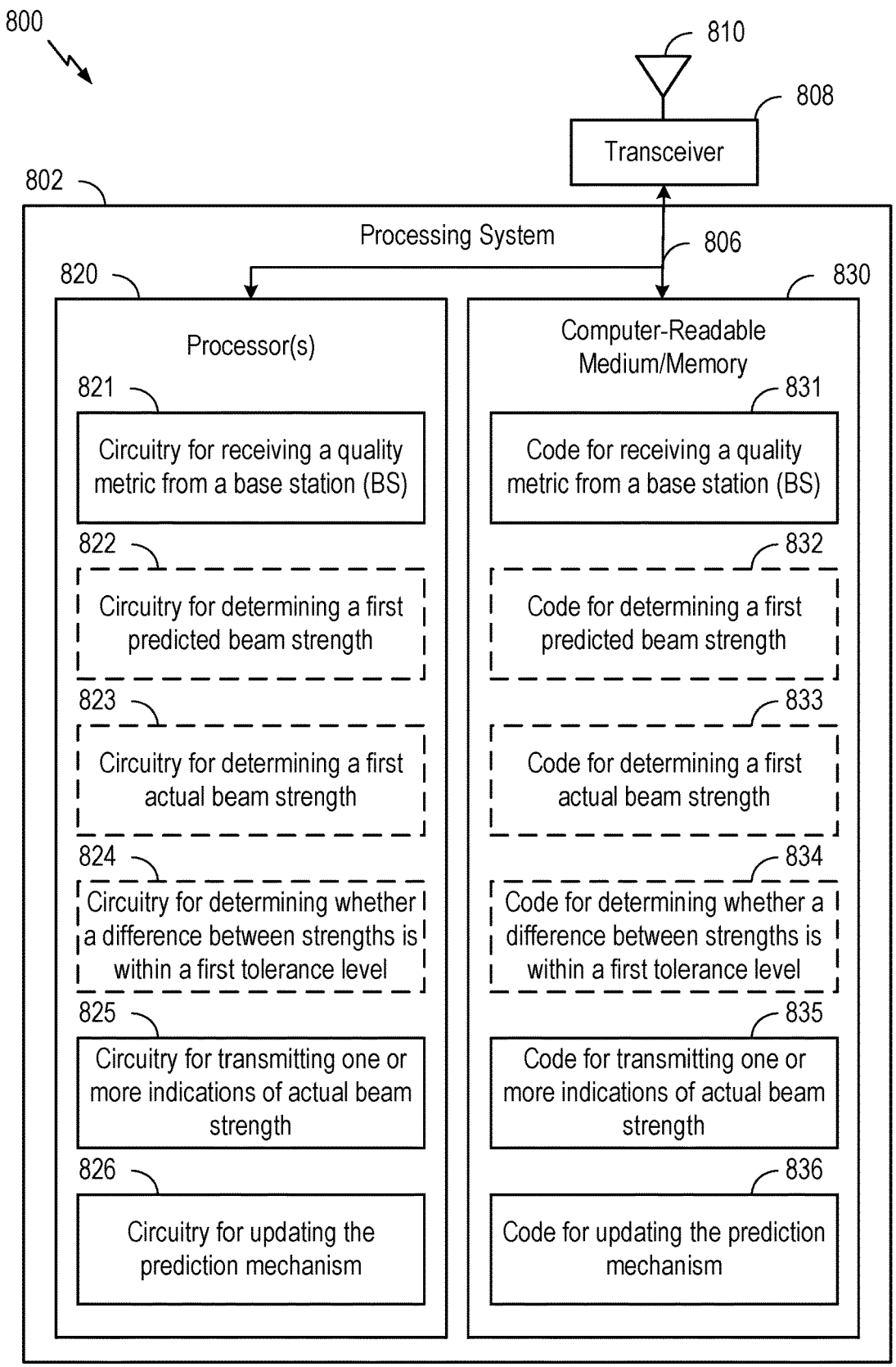
FIG. 8 is a block diagram illustrating aspects of an example communications device.

FIG. 8 depicts an example communications device 800 that includes various components operable, configured, or adapted to perform operations for the techniques disclosed herein, such as the operations depicted and described with respect to FIG. 6. In some examples, communication device 800 may be a UE 104 as described, for example with respect to FIGS. 1 and 2.

Communications device 800 includes a processing system 802 coupled to a transceiver 808 (e.g., a transmitter and/or a receiver). Transceiver 808 is configured to transmit (or send) and receive signals for the communications device 800 via an antenna 810, such as the various signals as described herein. Processing system 802 may be configured to perform processing functions for communications device 800, including processing signals received and/or to be transmitted by communications device 800.

Processing system 802 includes one or more processors 820 coupled to a computer-readable medium/memory 830 via a bus 806. In certain aspects, computer-readable medium/memory 830 is configured to store instructions (e.g., computer-executable code) that when executed by the one or more processors 820, cause the one or more processors 820 to perform the operations illustrated in FIG. 6, or other operations for performing the various techniques discussed herein for determining reliability of a beam prediction mechanism.

In the depicted example, computer-readable medium/memory 830 stores code 831 for receiving a quality metric from a base station (BS), the quality metric indicating one or more tolerance levels for predicted beam strength as compared to actual beam strength at the UE, code 832 for determining, prior to a first time period, a first predicted beam strength for a first transmit beam of the BS for the first time period based on a prediction mechanism, code 833 for determining a first actual beam strength as measured at the UE at the first time period, code 834 for determining whether a difference between the first predicted beam strength and the first actual beam strength is within a first tolerance level of the one or more tolerance levels, code 835 for transmit, to the BS, one or more indications of actual beam strength as measured at the UE at one or more time periods for one or more transmit beams of the BS, and code 836 for updating the prediction mechanism based at least in part on the difference not being within the first tolerance level for more than a threshold number of times.

In the illustrated example, the one or more processors 820 include circuitry configured to implement the code stored in the computer-readable medium/memory 830, including circuitry 821 for receiving a quality metric from a base station (BS), the quality metric indicating one or more tolerance levels for predicted beam strength as compared to actual beam strength at the UE, circuitry 822 for determining, prior to a first time period, a first predicted beam strength for a first transmit beam of the BS for the first time period based on a prediction mechanism, circuitry 823 for determining a first actual beam strength as measured at the UE at the first time period, circuitry 824 for determining whether a difference between the first predicted beam strength and the first actual beam strength is within a first tolerance level of the one or more tolerance levels, circuitry 825 for transmit, to the BS, one or more indications of actual beam strength as measured at the UE at one or more time periods for one or more transmit beams of the BS, and circuitry 826 for updating the prediction mechanism based at least in part on the difference not being within the first tolerance level for more than a threshold number of times.

Various components of communications device 800 may provide means for performing the methods described herein, including with respect to FIG. 6.

In some examples, means for transmitting or sending (or means for outputting for transmission) may include the transceivers 254 and/or antenna(s) 252 of the user equipment 104 illustrated in FIG. 2, transceiver 808 and antenna 810 of the communication device 800 in FIG. 8, and/or circuitry 825 for transmitting, to the BS, one or more indications of actual beam strength as measured at the UE at one or more time periods for one or more transmit beams of the BS.

In some examples, means for receiving (or means for obtaining) may include the transceivers 254 and/or antenna(s) 252 of the user equipment 104 illustrated in FIG. 2, transceiver 808 and antenna 810 of the communication device 800 in FIG. 8, and/or circuitry 821 for receiving a quality metric from a base station (BS), the quality metric indicating one or more tolerance levels for predicted beam strength as compared to actual beam strength at the UE.

In some examples, means for determining, prior to a first time period, a first predicted beam strength for a first transmit beam of the BS for the first time period based on a prediction mechanism; determining a first actual beam strength as measured at the UE at the first time period; determining whether a difference between the first predicted beam strength and the first actual beam strength is within a first tolerance level of the one or more tolerance levels; taking an action based at least in part on whether the difference is within the first tolerance level; updating the prediction mechanism based at least in part on the difference not being within the first tolerance level for more than a threshold number of times; determining whether a difference between the first predicted beam strength and the first actual beam strength is within a first tolerance level of the one or more tolerance levels, wherein the first tolerance level is associated with a first value range, and wherein at least one of the first predicted beam strength or the first actual beam strength is within the first value range; and determine whether a difference between the first predicted beam strength and the first actual beam strength is within a first tolerance level of the one or more tolerance levels, wherein the first tolerance level is associated with a first ranking, and wherein at least one of the first predicted beam strength or the first actual beam strength has a value ranked at the first ranking among values of predicted beam strength or actual beam strength corresponding to a plurality of transmit beams of the BS; may include various processing system components, such as: the one or more processors 820 in FIG. 8, or aspects of the UE 104 illustrated in FIGS. 1 and 2, receive processor 258, transmit processor 264, TX MIMO processor 266, and/or controller/processor 280 (including the beam strength predictor 198).

Notably, FIG. 8 is an example, and many other examples and configurations of communication device 800 are possible.

Figure 9:
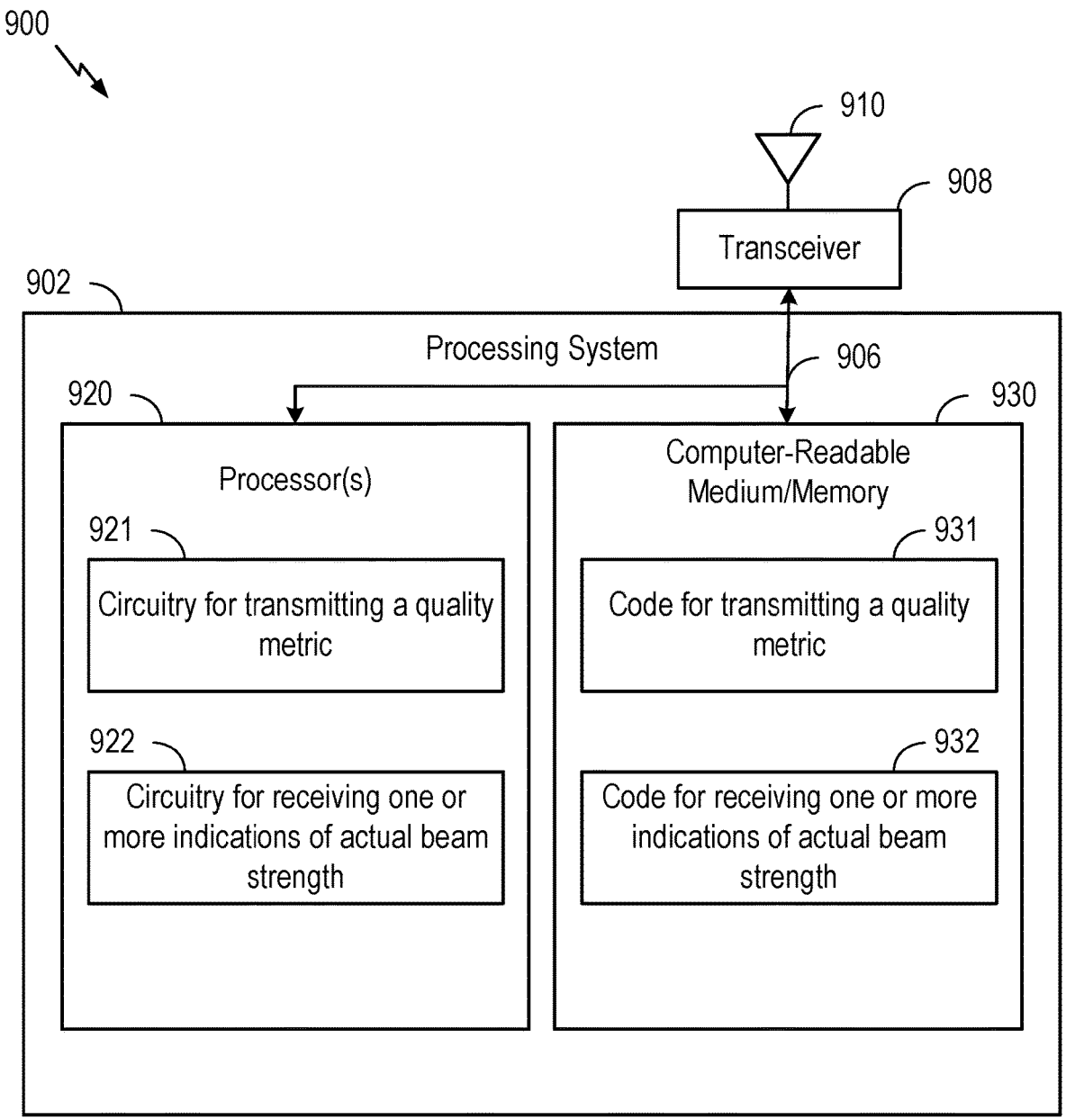
FIG. 9 is a block diagram illustrating aspects of an example communications device.

FIG. 9 depicts an example communications device 900 that includes various components operable, configured, or adapted to perform operations for the techniques disclosed herein, such as the operations depicted and described with respect to FIG. 7. In some examples, communication device 900 may be a base station 102 as described, for example with respect to FIGS. 1 and 2.

Communications device 900 includes a processing system 902 coupled to a transceiver 908 (e.g., a transmitter and/or a receiver). Transceiver 908 is configured to transmit (or send) and receive signals for the communications device 900 via an antenna 910, such as the various signals as described herein. Processing system 902 may be configured to perform processing functions for communications device 900, including processing signals received and/or to be transmitted by communications device 900.

Processing system 902 includes one or more processors 920 coupled to a computer-readable medium/memory 930 via a bus 906. In certain aspects, computer-readable medium/memory 930 is configured to store instructions (e.g., computer-executable code) that when executed by the one or more processors 920, cause the one or more processors 920 to perform the operations illustrated in FIG. 7, or other operations for performing the various techniques discussed herein to (e.g., determine and) tranmsit a quality metric to the UE 104.

In the depicted example, computer-readable medium/memory 930 stores code 931 for transmitting, to a UE, a quality metric indicative of one or more tolerance levels for predicted beam strength as compared to actual beam strength at the UE, and code 932 for receiving, from the UE, one or more indications of actual beam strength as measured at the UE at one or more time periods for one or more transmit beams of the BS.

In the depicted example, the one or more processors 920 include circuitry configured to implement the code stored in the computer-readable medium/memory 930, including circuitry 921 for transmit, to a user equipment (UE), a quality metric indicative of one or more tolerance levels for predicted beam strength as compared to actual beam strength at the UE, and circuitry 922 for receiving, from the UE, one or more indications of actual beam strength as measured at the UE at one or more time periods for one or more transmit beams of the BS.

Various components of communications device 900 may provide means for performing the methods described herein, including with respect to FIG. 7.

In some examples, means for transmitting or sending (or means for outputting for transmission) may include the transceivers 232 and/or antenna(s) 234 of the base station 102 illustrated in FIG. 2, transceiver 908 and antenna 910 of the communication device 900 in FIG. 9, and/or circuitry 921 for transmitting, to a user equipment (UE), a quality metric indicative of one or more tolerance levels for predicted beam strength as compared to actual beam strength at the UE.

In some examples, means for receiving (or means for obtaining) may include the transceivers 232 and/or antenna(s) 234 of the base station illustrated in FIG. 2, transceiver 908 and antenna 910 of the communication device 900 in FIG. 9, and/or circuitry 922 for receiving, from the UE, one or more indications of actual beam strength as measured at the UE at one or more time periods for one or more transmit beams of the BS.

EXAMPLE CLAUSES

Implementation examples are described in the following numbered clauses:

Clause 1: A user equipment (UE), comprising: a memory; and a processor coupled to the memory, the processor and the memory configured to: receive a quality metric from a base station (BS), the quality metric indicating one or more tolerance levels for predicted beam strength as compared to actual beam strength at the UE; and transmit, to the BS, one or more indications of actual beam strength as measured at the UE at one or more time periods for one or more transmit beams of the BS.

Clause 2: The UE of clause 1, wherein the processor and the memory are further configured to: determine, prior to a first time period, a first predicted beam strength for a first transmit beam of the BS for the first time period based on a prediction mechanism; determine a first actual beam strength as measured at the UE at the first time period; determine whether a difference between the first predicted beam strength and the first actual beam strength is within a first tolerance level of the one or more tolerance levels; and take an action based at least in part on whether the difference is within the first tolerance level.

Clause 3: The UE of any of clauses 1 and 2, wherein to take the action comprises to: transmit, to the BS, an indication of whether the difference is within the first tolerance level.

Clause 4: The UE of any of clauses 1-3, wherein to take the action comprises to: update the prediction mechanism based at least in part on the difference not being within the first tolerance level for more than a threshold number of times.

Clause 5: The UE of any of clauses 1-4, wherein the prediction mechanism comprises a machine learning model.

Clause 6: The UE of any of clauses 1-5, wherein the one or more tolerance levels comprise a plurality of tolerance levels, each tolerance level associated with a different value range for at least one of predicted beam strength or actual beam strength.

Clause 7: The UE of any of clauses 1 and 3-6, wherein the processor and the memory are further configured to: determine, prior to a first time period, a first predicted beam strength for a first transmit beam of the BS for the first time period based on a prediction mechanism; determine a first actual beam strength as measured at the UE at the first time period; determine whether a difference between the first predicted beam strength and the first actual beam strength is within a first tolerance level of the one or more tolerance levels, wherein the first tolerance level is associated with a first value range, and wherein at least one of the first predicted beam strength or the first actual beam strength is within the first value range; and take an action based at least in part on whether the difference is within the first tolerance level.

Clause 8: The UE of any of clauses 1 and 3-6, wherein the one or more tolerance levels comprise a plurality of tolerance levels, each tolerance level associated with a different ranking for at least one of predicted beam strength or actual beam strength.

Clause 9: The UE of any of clauses 1, 3-6, and 8 wherein the processor and the memory are further configured to: determine, prior to a first time period, a first predicted beam strength for a first transmit beam of the BS for the first time period based on a prediction mechanism; determine a first actual beam strength as measured at the UE at the first time period; determine whether a difference between the first predicted beam strength and the first actual beam strength is within a first tolerance level of the one or more tolerance levels, wherein the first tolerance level is associated with a first ranking, and wherein at least one of the first predicted beam strength or the first actual beam strength has a value ranked at the first ranking among values of predicted beam strength or actual beam strength corresponding to a plurality of transmit beams of the BS; and take an action based at least in part on whether the difference is within the first tolerance level.

Clause 10: The UE of any of clauses 1-9, wherein the one or more indications comprise one or more statistics for at least a first time period of the one or more time periods and for at least a first transmit beam of the one or more transmit beams of the BS, the one or more statistics comprising a percentage of time predicted beam strength at the UE is within the one or more tolerance levels of actual beam strength as measured at the UE.

Clause 11: The UE of any of clauses 1-10, wherein the processor and the memory are further configured to receive an updated quality metric from the BS.

Clause 12: The UE of any of clauses 1-11, wherein the updated quality metric is received in response to a mobility status change of the UE.

Clause 13: A base station (BS), comprising: a memory; and a processor coupled to the memory, the processor and the memory configured to: transmit, to a user equipment (UE), a quality metric indicative of one or more tolerance levels for predicted beam strength as compared to actual beam strength at the UE; and receive, from the UE, one or more indications of actual beam strength as measured at the UE at one or more time periods for one or more transmit beams of the BS.

Clause 14: The BS of clause 13, wherein the one or more indications of actual beam strength comprises an indication of whether a difference between predicted beam strength and actual beam strength is within a first tolerance level of the one or more tolerance levels.

Clause 15: The BS of any of clauses 13 and 14, wherein the one or more tolerance levels comprise a plurality of tolerance levels, each tolerance level associated with a different value range for at least one of predicted beam strength or actual beam strength.

Clause 16: The BS of any of clauses 13-15, wherein the one or more tolerance levels comprise a plurality of tolerance levels, each tolerance level associated with a different ranking for at least one of predicted beam strength or actual beam strength.

Clause 17: The BS of any of clauses 13-16, wherein the one or more indications comprise one or more statistics for at least a first time period of the one or more time periods and for at least a first transmit beam of the one or more transmit beams of the BS, the one or more statistics comprising a percentage of time predicted beam strength at the UE is within the one or more tolerance levels of actual beam strength as measured at the UE.

Clause 18: The BS of any of clauses 13-17, wherein the processor and the memory are further configured to transmit an updated quality metric to the UE.

Clause 19: The BS of any of clauses 13-18, wherein the updated quality metric is transmitted in response to a mobility status change of the UE.

Clause 20: A method of communication by a user equipment (UE), the method comprising: receiving a quality metric from a base station (BS), the quality metric indicating one or more tolerance levels for predicted beam strength as compared to actual beam strength at the UE; and transmitting, to the BS, one or more indications of actual beam strength as measured at the UE at one or more time periods for one or more transmit beams of the BS.

Clause 21: The method of clause 20, further comprising: determining, prior to a first time period, a first predicted beam strength for a first transmit beam of the BS for the first time period based on a prediction mechanism; determining a first actual beam strength as measured at the UE at the first time period; determining whether a difference between the first predicted beam strength and the first actual beam strength is within a first tolerance level of the one or more tolerance levels; and taking an action based at least in part on whether the difference is within the first tolerance level.

Clause 22: The method of any of clauses 20 and 21, wherein taking the action further comprises transmitting, to the BS, an indication of whether the difference is within the first tolerance level.

Clause 23: The method of any of clauses 20-22, wherein taking the action further comprises updating the prediction mechanism based at least in part on the difference not being within the first tolerance level for more than a threshold number of times.

Clause 24: The method of any of clauses 20-23, wherein the prediction mechanism comprises a machine learning model.

Clause 25: The method of any of clauses 20-24, wherein the one or more tolerance levels comprise a plurality of tolerance levels, each tolerance level associated with a different value range for at least one of predicted beam strength or actual beam strength.

Clause 26: The method of any of clauses 20 and 22-25, further comprising: determining, prior to a first time period, a first predicted beam strength for a first transmit beam of the BS for the first time period based on a prediction mechanism; determining a first actual beam strength as measured at the UE at the first time period; determining whether a difference between the first predicted beam strength and the first actual beam strength is within a first tolerance level of the one or more tolerance levels, wherein the first tolerance level is associated with a first value range, and wherein at least one of the first predicted beam strength or the first actual beam strength is within the first value range; and taking an action based at least in part on whether the difference is within the first tolerance level.

Clause 27: The method of any of clauses 20 and 22-25, wherein the one or more tolerance levels comprise a plurality of tolerance levels, each tolerance level associated with a different ranking for at least one of predicted beam strength or actual beam strength.

Clause 28: The method of any of clauses 20, 22-25, and 27 further comprising: determining, prior to a first time period, a first predicted beam strength for a first transmit beam of the BS for the first time period based on a prediction mechanism; determining a first actual beam strength as measured at the UE at the first time period; determining whether a difference between the first predicted beam strength and the first actual beam strength is within a first tolerance level of the one or more tolerance levels, wherein the first tolerance level is associated with a first ranking, and wherein at least one of the first predicted beam strength or the first actual beam strength has a value ranked at the first ranking among values of predicted beam strength or actual beam strength corresponding to a plurality of transmit beams of the BS; and taking an action based at least in part on whether the difference is within the first tolerance level.

Clause 29: The method of any of clauses 20-28, wherein predicted beam strength comprises predicted reference signal received power (RSRP) and actual beam strength comprises actual RSRP.

Clause 30: A non-transitory computer-readable medium having instructions stored thereon that, when executed by a user equipment (UE), cause the UE to perform a method in accordance with any of clauses 20-29.

Clause 31: A method of wireless communication by a base station (BS), the method comprising: transmitting, to a user equipment (UE), a quality metric indicative of one or more tolerance levels for predicted beam strength as compared to actual beam strength at the UE; and receiving, from the UE, one or more indications of actual beam strength as measured at the UE at one or more time periods for one or more transmit beams of the BS.

Clause 32: The method of clause 31, wherein the one or more indications of actual beam strength comprises an indication of whether a difference between predicted beam strength and actual beam strength is within a first tolerance level of the one or more tolerance levels.

Clause 33: The method of any of clauses 31 and 32, wherein the one or more tolerance levels comprise a plurality of tolerance levels, each tolerance level associated with a different value range for at least one of predicted beam strength or actual beam strength.

Clause 34: The method of any of clauses 31-33, wherein the one or more tolerance levels comprise a plurality of tolerance levels, each tolerance level associated with a different ranking for at least one of predicted beam strength or actual beam strength.

Clause 35: The method of any of clauses 31-34, wherein predicted beam strength comprises predicted reference signal received power (RSRP) and actual beam strength comprises actual RSRP.

Clause 36: The method of any of clauses 31-35, wherein the processor and the memory are further configured to transmit an updated quality metric to the UE.

Clause 37: The method of any of clauses 31-36, wherein the updated quality metric is transmitted in response to a mobility status change of the UE.

Clause 38: The method of any of clauses 20-29 or 31-37, wherein the one or more indications comprise one or more statistics for at least a first time period of the one or more time periods and for at least a first transmit beam of the one or more transmit beams of the BS, the one or more statistics comprising a percentage of time predicted beam strength at the UE is within the one or more tolerance levels of actual beam strength as measured at the UE Clause 39: An apparatus, comprising means for performing a method in accordance with any of clauses 20-29.

Clause 40: An apparatus, comprising means for performing a method in accordance with any of clauses 31-38.

Clause 41: A non-transitory computer-readable medium comprising executable instructions that, when executed by one or more processors of an apparatus, cause the apparatus to perform a method in accordance with any of clauses 31-38.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a NodeB and/or a narrowband subsystem serving this coverage area, depending on the context in which the term is used. In NR systems, the term "cell" and BS, next generation NodeB (gNB or gNodeB), access point (AP), distributed unit (DU), carrier, or transmission reception point may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area (e.g., a sports stadium) and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). A BS for a macro cell may be referred to as a macro BS. A BS for a pico cell may be referred to as a pico BS. A BS for a femto cell may be referred to as a femto BS, home BS, or a home NodeB.

Base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). Base stations 102 configured for 5G (e.g., 5G NR or Next Generation RAN (NG-RAN)) may interface with 5GC 190 through second backhaul links 184. Base stations 102 may communicate directly or indirectly (e.g., through the EPC 160 or 5GC 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 giga-hertz (GHz) unlicensed frequency spectrum as used by the Wi-Fi AP 150. Small cell 102', employing NR in an unlicensed frequency spectrum, may boost coverage to and/or increase capacity of the access network.

Some base stations, such as gNB 180 may operate in a traditional sub-6 GHz spectrum, in millimeter wave (mmWave) frequencies, and/or near mmWave frequencies in communication with the UE 104. When the gNB 180 operates in mmWave or near mmWave frequencies, the gNB 180 may be referred to as an mmWave base station.

The communication links 120 between base stations 102 and, for example, UEs 104, may be through one or more carriers. For example, base stations 102 and UEs 104 may use spectrum up to Y MHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communications system 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

5GC 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and 5GC 190. Generally, AMF 192 provides QoS flow and session management.

All user Internet protocol (IP) packets are transferred through UPF 195, which is connected to the IP Services 197, and which provides UE IP address allocation as well as other functions for 5GC 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At UE 104, antennas 252a-252r may receive the downlink signals from the BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 102.

At BS 102, the uplink signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

As above, FIGS. 3A-3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^\mu \times 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 3A-3D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Additional Considerations

The preceding description provides examples of predicting beam strength of a transmitting beam in communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), CDMA2000, and others. UTRA includes Wideband CDMA (WCDMA) and other variants of CDMA. CDMA2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (see FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A user equipment (UE), comprising:
one or more memories comprising executable instructions; and
one or more processors configured to execute the executable instructions and to cause the UE to:
receive a quality metric from a base station (BS), the quality metric indicating one or more tolerance levels for predicted beam strength as compared to actual beam strength at the UE; and
transmit, to the BS, one or more indications of actual beam strength as measured at the UE at one or more time periods for one or more transmit beams of the BS,
wherein the one or more tolerance levels comprise a plurality of tolerance levels, each tolerance level associated with a different value range or a different ranking for at least one of predicted beam strength or actual beam strength.

2. The UE of claim 1, wherein the one or more processors are further configured to cause the UE to:
determine, prior to a first time period, a first predicted beam strength for a first transmit beam of the BS for the first time period based on a prediction mechanism;
determine a first actual beam strength as measured at the UE at the first time period;
determine whether a difference between the first predicted beam strength and the first actual beam strength is within a first tolerance level of the one or more tolerance levels; and
take an action based at least in part on whether the difference is within the first tolerance level.

3. The UE of claim 2, wherein, in order to take the action, the one or more processors are configured to cause the UE to transmit, to the BS, an indication of whether the difference is within the first tolerance level.

4. The UE of claim 2, wherein, in order to take the action, the one or more processors are configured to cause the UE to update the prediction mechanism based at least in part on the difference not being within the first tolerance level for more than a threshold number of times.

5. The UE of claim 2, wherein the prediction mechanism comprises a machine learning model.

6. The UE of claim 1, wherein:
each tolerance level is associated with the different value range for the at least one of predicted beam strength or actual beam strength; and
the one or more processors are further configured to cause the UE to:
determine, prior to a first time period, a first predicted beam strength for a first transmit beam of the BS for the first time period based on a prediction mechanism;
determine a first actual beam strength as measured at the UE at the first time period;
determine whether a difference between the first predicted beam strength and the first actual beam strength is within a first tolerance level of the one or more tolerance levels, wherein the first tolerance level is associated with a first value range, and wherein at least one of the first predicted beam strength or the first actual beam strength is within the first value range; and
take an action based at least in part on whether the difference is within the first tolerance level.

7. The UE of claim 1, wherein;
each tolerance level is associated with the different ranking for the at least one of predicted beam strength or actual beam strength; and
the one or more processors are further configured to cause the UE to:
determine, prior to a first time period, a first predicted beam strength for a first transmit beam of the BS for the first time period based on a prediction mechanism;
determine a first actual beam strength as measured at the UE at the first time period;
determine whether a difference between the first predicted beam strength and the first actual beam strength is within a first tolerance level of the one or more tolerance levels, wherein the first tolerance level is associated with a first ranking, and wherein at least one of the first predicted beam strength or the first actual beam strength has a value ranked at the first ranking among values of predicted beam strength or actual beam strength corresponding to a plurality of transmit beams of the BS; and
take an action based at least in part on whether the difference is within the first tolerance level.

8. The UE of claim 1, wherein the one or more processors are further configured to cause the UE to receive an updated quality metric from the BS.

9. The UE of claim 8, wherein the updated quality metric is received in response to a mobility status change of the UE.

10. A base station (BS), comprising:
one or more memories comprising executable instructions; and
one or more processors configured to execute the executable instructions and to cause the BS to:
transmit, to a user equipment (UE), a quality metric indicative of one or more tolerance levels for predicted beam strength as compared to actual beam strength at the UE; and
receive, from the UE, one or more indications of actual beam strength as measured at the UE at one or more time periods for one or more transmit beams of the BS,
wherein the one or more tolerance levels comprise a plurality of tolerance levels, each tolerance level associated with a different value range or a different ranking for at least one of predicted beam strength or actual beam strength.

11. The BS of claim 10, wherein the one or more indications of actual beam strength comprises an indication of whether a difference between predicted beam strength and actual beam strength is within a first tolerance level of the one or more tolerance levels.

12. The BS of claim 10, wherein the one or more processors are further configured to cause the BS to transmit an updated quality metric to the UE.

13. The BS of claim 12, wherein the updated quality metric is transmitted in response to a mobility status change of the UE.

14. A user equipment (UE), comprising:
one or more memories comprising executable instructions; and
one or more processors configured to execute the executable instructions and to cause the UE to:
receive a quality metric from a base station (BS), the quality metric indicating one or more tolerance levels for predicted beam strength as compared to actual beam strength at the UE; and
transmit, to the BS, one or more indications of actual beam strength as measured at the UE at one or more time periods for one or more transmit beams of the BS,
wherein the one or more indications comprise one or more statistics for at least a first time period of the one or more time periods and for at least a first transmit beam of the one or more transmit beams of the BS, the one or more statistics comprising a percentage of time the predicted beam strength at the UE is within the one or more tolerance levels of the actual beam strength as measured at the UE.

15. A base station (BS), comprising:
one or more memories comprising executable instructions; and
one or more processors configured to execute the executable instructions and to cause the BS to:
transmit, to a user equipment (UE), a quality metric indicative of one or more tolerance levels for predicted beam strength as compared to actual beam strength at the UE; and
receive, from the UE, one or more indications of actual beam strength as measured at the UE at one or more time periods for one or more transmit beams of the BS,
wherein the one or more indications comprise one or more statistics for at least a first time period of the one or more time periods and for at least a first transmit beam of the one or more transmit beams of the BS, the one or more statistics comprising a percentage of time the predicted beam strength at the UE is within the one or more tolerance levels of the actual beam strength as measured at the UE.

* * * * *